United States Patent [19]

Knapp

[11] Patent Number: 4,856,758
[45] Date of Patent: Aug. 15, 1989

[54] SILICON CARBIDE VALVE ELEMENTS

[75] Inventor: Alfons Knapp, Bibevach, Fed. Rep. of Germany

[73] Assignee: Masco Corporation, Taylor, Mich.

[21] Appl. No.: 509,301

[22] Filed: Jun. 30, 1983

[30] Foreign Application Priority Data

Jun. 11, 1982 [IT] Italy .............................. 67746 A/82

[51] Int. Cl.⁴ .............................................. F16L 5/00
[52] U.S. Cl. .................................. 251/368; 137/625.41
[58] Field of Search .................. 423/345; 137/625.17, 137/625.4, 625.41; 251/368

[56] References Cited

U.S. PATENT DOCUMENTS

| | | | |
|---|---|---|---|
| 3,331,396 | 7/1967 | Willis | 251/368 |
| 3,465,782 | 9/1969 | Parkison et al. | 251/368 |
| 3,533,436 | 10/1970 | Parkison | 137/375 |
| 3,533,444 | 10/1970 | Lyon | 137/625.17 |
| 3,683,965 | 8/1972 | McClure et al. | 251/368 |
| 3,736,959 | 6/1973 | Parkison | 137/625.17 |
| 3,767,164 | 10/1973 | Robinson | 251/368 |
| 3,837,356 | 9/1974 | Selep et al. | 251/368 |
| 4,088,153 | 5/1978 | Paasikivi | 137/625.17 |
| 4,327,758 | 5/1982 | Uhlmann | 137/625.41 |
| 4,337,920 | 7/1982 | Parris | 251/368 |

Primary Examiner—A. Michael Chambers
Attorney, Agent, or Firm—Steven L. Permut; Malcolm L. Sutherland

[57] ABSTRACT

At least one of a pair of valve members which control the flow in a valve is composed substantially of silicon carbide (SiC). Preferably, the silicon carbide valve member is produced by the Lagan SiC process. It is possible to use a single silicon carbide valve member cooperating with a valve member of conventional ceramic material, or both cooperating valve members may be made of silicon carbide. Preferably, materials of different surface hardness are used for the cooperating valve members. In addition, one of the cooperating valve members preferably is softer and has a less smoothly polished surface than the other valve member. The silicon carbide material has a low friction coefficient even in the absence of lubrication and does not give rise to excessive adhesion between pieces of high surface finish and thus ensures the maintenance and the smoothness of operation for long periods of time with respect to the known ceramics.

11 Claims, 1 Drawing Sheet

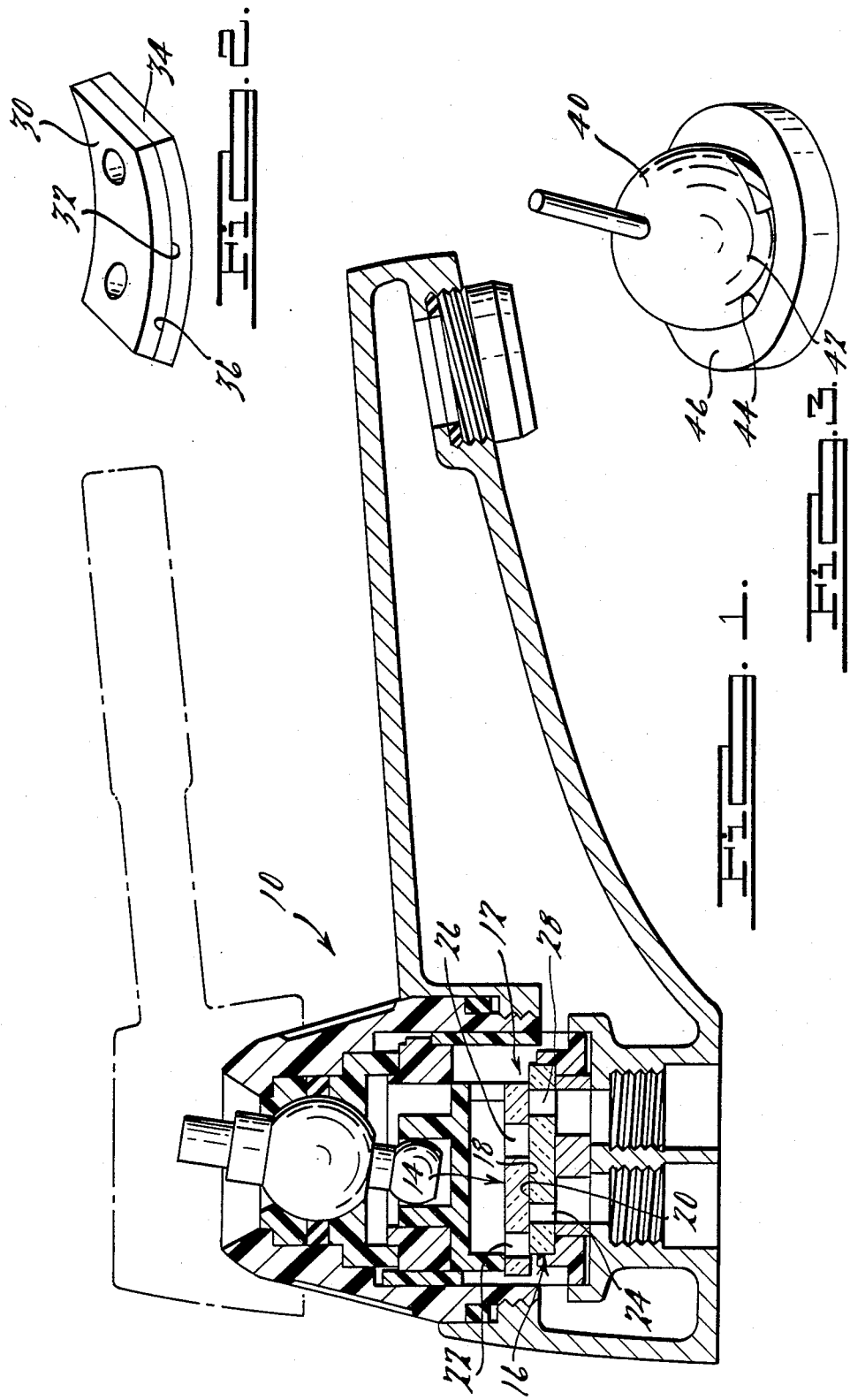

SILICON CARBIDE VALVE ELEMENTS

TECHNICAL FIELD

This invention relates to hard material valve members for valves.

DISCLOSURE INFORMATION

The use of hard material valve members as flow control members in valves for hydraulic systems is becoming commonplace. Normally, these members are manufactured from aluminum oxides or silicates which are sintered and then polished to a roughness of about 0.2 to 0.4 microns. Precise and smooth surfaces render the flow control members suitable for intercepting and adjusting a flow of water. The high hardness of the material, in the order of 23,000 N/mm$^2$, provides durability. The hard surfaces are able to expel even hard foreign matters, such as grains of sand, which may come into contact with them, without suffering any damage.

However, the abutment of two smooth surfaces tend to cause these valve members to mutually adhere which, in the absence of lubricants, gives rise to a high sliding friction which is higher than even an already relatively high friction coefficient, of nearly 0.12, for these materials.

For a correct operation of valves incorporating such hard material members, the members are commonly coated with a thin layer of silicon lubricant which reduces the sliding friction to acceptable values. But after numerous operations of the valve, the lubricant is gradually expelled and finally the friction increases to unacceptable values which in extreme cases may give rise to a locking of the members.

It is desired to have hard material members for the use mentioned hereinabove with a reduced coefficient of friction. It is also desired that the hard material members have a reduced coefficient of friction in the absence of lubricants so as to allow regular operation for long periods of time without the necessity of any maintenance. These advantages are to be achieved with an acceptable cost of production.

SUMMARY OF THE INVENTION

According to the invention, a valve includes first and second flow control valve members slidably mounted against each other with at least one of the valve members composed substantially of silicon carbide (SiC).

The hardness of silicon carbide in various known crystalline modifications varies between 28,000 and 35,000 N/mm$^2$, i.e. substantially higher than the conventional ceramic materials commonly used for this purpose. The friction coefficient of silicon carbide approaches the value of 0.05. In addition, this material has a reduced adhesion tendency so that frictional forces between high finish worked surfaces, are substantially reduced. Therefore, a valve mechanism incorporating hard material members in which at least one of the members is made of silicon carbide may be assembled without introducing any lubricant between the members. If a lubricant is used, which may be convenient for practical reasons, there is no danger for the valve to stiffen up or otherwise become difficult to operate after the lubricant dissipates.

In one embodiment of the invention, one of the valve members is composed substantially of silicon carbide and the other is made from a conventional softer ceramic material formed by aluminum oxides or silicates.

In an alternate embodiment of the invention, both valve members are composed substantially of silicon carbide, but they are formed from silicon carbides of different crystalline structure with a considerable difference in hardness.

A significant reduction of the friction between hard material members, in the absence of any lubricant, is obtained if the valve member have a significant difference of hardness, in the order of 1,000 N/mm$^2$ or more.

BRIEF DESCRIPTION OF THE DRAWING

Reference now will be made to the accompanying drawings in which:

FIG. 1 is a side elevational and segmented view of a faucet incorporating planar silicon carbide valve members;

FIG. 2 is a perspective view of a complementary pair of concave and convex valve members;

FIG. 3 is a perspective view of a spherical valve member seated on a concave valve member.

DETAILED DESCRIPTION OF THE PREFERRED EMBODIMENT

Referring to FIG. 1 a faucet 10 has a single handle mixing valve 12. The valve details are described in copending patent application U.S. Ser. No. 485,837 entitled A THERMAL COMPENSATED CARTRIDGE MIXER VALVE and filed by the applicant on April 18, 1983. The detailed information found therein is incorporated into this application by reference.

The mixing valve 12 includes two valve plates 14 and 16. Each plate member 14 and 16 has a flat surface 18 and 20 slidably abutting each other under a compressive force. Valve plate 14 has a cold water passage 22 therethrough and a hot water passage 26 therethrough. Valve plate 16 has a cold water passage 24 and a hot water passage 28. The two valve plates 14 and 16 can slide to a closed position, as sown, where the passages 22 and 24 and passages 26 and 28 are misaligned from each other. The valve plate 14 can slide on plate 16 so passages 22 and 24 can become aligned and passages 26 and 28 can become aligned either independently or together.

Valve plate 14 is made from silicon carbide (SiC). in accordance with the Lagan SiC process. The valve plate 14 can have a hardness between 28,000–35,000 N/mm$^2$ The lower plate 16 is made from conventional ceramic materials with a hardness of approximately 23,000 N/mm$^2$ There is, therefore, a hardness difference from 5,000 to 12,000 N/mm$^2$ between the plates 14 and 16. The valve plates have a low coefficient of friction even in the absence of any lubricant, and in spite of the locking tendency of the ceramic valve plate 16.

The plate 14 having a greater hardness has a smoothly polished surface. The softer plate 16 can have a less refined polished surface providing a plurality of microscopic cavities that reduce the bearing contact area between the two plates and consequently reduce the frictional forces between the two plates. In the presence of substantial differences of hardness as may be obtained between a plate of silicon carbide and a plate made of a ceramic material, there is no possibility for the harder and smoothly polished plate to be scratched or otherwise damaged by the softer and rougher plate.

The production of hard material valve plates made of silicon carbide can be carried out industrially in a very convenient manner. It is known that pieces of silicon carbide can be formed from semifinished products made of carbonaceous material containing binders, which are subsequently subjected to baking until the components different from carbon are eliminated, followed then by silicification at a high temperature in a gaseous medium. The semifinished products are easily workable, but above all they may be precision formed with low manufacturing tolerances. The subsequent stage of silicification takes place without introducing deformations or variations of dimensions in the pieces. By this method, one can obtain pieces formed from silicon carbide require only a minimum final polishing operation, or may even not require it at all. The pieces have close dimensional tolerances. The method is reliable and produces virtually no defective pieces. Therefore, the silicon carbide valve plates according to the invention can be produced at comparable or even lower costs relative to the conventional plates made of a ceramic material.

An advantage of the silicon carbide plates for valves resides in the high chemical stability of this compound. In fact, this compound is not subject to corrosion in water, and has an exceptional resistance to oxidation.

Another advantage derives from the dimensional precision of the pieces made of silicon carbide, which allows a reduction in manufacturing tolerances. Designs are constrained by some dimensions, which take into account the tolerances in the dimensions of the plates. The reduction in manufacturing tolerances reduces the constraints that a design has thereby allowing more flexibility in the design itself.

Alternatively, the valve plate 16 can also be made from silicon carbide having a different hardness than valve plate 14. As already previously mentioned, the hardness of the silicon carbide may vary from about 28,000 to about 35,000 N/mm$^2$, and therefore it is possible to provide pairs of silicon carbide plates having differences of hardness up to 7,000 N/mm$^2$. The coefficient of friction between two plates of silicon carbide, is significantly lowered when the two plates have a hardness difference over 1,000 N/mm$^2$.

Alternatively, upper plate 14 can be made from conventional ceramic materials, and lower plate 16 made from silicon carbide.

Also, the possibility of providing complexly shaped pieces made of silicon carbide allow a higher freedom in designing the sliding valve members. With regard to this, it should be noted that the invention is applicable both to plane plates and to valve members or similar bodies in which the working surfaces are convex or concave, for example spherical surfaces.

FIG. 2 shows an upper valve member 30 having a convex surface 32 and a lower valve member 34 having a complementary concave surface 36. Similar to the first embodiment, one or both of the valve members 20 and 24 are made from silicon carbide.

FIG. 3 shows a ball valve 40 having a spherical surface 42 seated on a spherically concave surface 44 of lower valve member 46. Similar to the first two embodiments one or both members 40 and 46 are made from silicon carbide.

The cooperating valve members ensure each in the operation of the valve without the necessity of a lubricant, and for periods of time much longer than those obtained hitherto.

The invention can apply to any shaped valve member shape and any number of the valve members employed in a valve. Consequently, the invention can apply to valves having two or three members, or to a single valve member of complex shape cooperating with sleeve-like valve members disposed at the inlet for the water. In addition, the invention can apply to valves in which a valve member provides water flow in one direction or in a valve member that allows water to flow through the member in a first direction and then in the opposite direction. For the formation of a valve member according to the invention, it is possible to use pure silicon carbide or a silicon carbide containing other substances, for example, impurities or additives.

The modifications indicated hereinabove, as well as other modifications and any substitution by technical equivalents, may be made to what has been described and shown, without departing from the spirit of the invention and the scope of this patent.

The embodiments in which an exclusive property or privilege is claimed are defined as follows:

1. A valve comprising a first valve member and a second valve member slidably mounted against each other under compressive force for movement to a closed position and an open position, one said first and second valve members being composed substantially of silicon carbide;
    said other of said first and second valve members being made of a ceramic material of lower hardness than said one valve member.

2. A valve as defined in claim 1, characterized in that the valve member having higher hardness has a fine surface finish and the valve member of lower hardness has a less smooth surface comprising a plurality of microscopic cavities so as to considerably reduce the bearing surface between the two cooperating valve members.

3. A valve comprising:
    a first and second flow control valve member having abutting surfaces and slidably mounted against each other under a compressive force;
    said first flow control valve member being composed substantially of silicon carbide;
    said second valve member being composed substantially of silicon carbide; and
    the two valve members composed substantially of silicon carbide having different hardnesses with the silicon carbide in said valve members having different crystalline structures.

4. A valve as defined in claim 3, characterized in that the valve member having higher hardness has a fine surface finish and the valve member of lower hardness has a less smooth surface comprising a plurality of microscopic cavities such as to considerably reduce the bearing surface between the two cooperating valve members.

5. A valve as defined in claim 4 characterized by said abutting surfaces of mutual contact being planar.

6. A valve, as defined in claim 4 characterized by said abutting surfaces of mutual contact being complementarily convex and concave in shape.

7. A valve, as claimed in claim 6, characterized by said abutting surfaces forming part of a sphere.

8. A valve as defined in claim 3, characterized by said abutting surfaces of mutual contact being planar.

9. A valve, as defined in claim 3 characterized by said abutting surfaces of mutual contact being complementarily convex and concave in shape.

10. A valve comprising:
a first valve member:
a second valve member mounted for sliding movement against said first valve member under a compressive force to a closed and open position;
said first and second member being composed of differing ceramic materials having a hardness difference greater or approximately equal to 1,000 N/mm$^2$.

11. A valve as defined in claim 10 wherein:
the valve member having the higher hardness has a fine surface finish and the valve member of lower hardness has a less smooth surface comprising a plurality of microscopic cavities so as to considerably reduce the bearing surface between said two valve members.

* * * * *